Patented Mar. 13, 1934

1,950,945

UNITED STATES PATENT OFFICE 1,950,945

MANUFACTURE OF FERTILIZERS

Emil Lüscher, Basel, Switzerland, assignor to the firm of Lonza Elektrizitatswerke und Chemische Fabriken Aktiengesellschaft, Basel, Switzerland No Drawing. Application April 4, 1930, Serial No. 441,724. In Germany October 14, 1929

9 Claims. (Cl. 71—7)

There have been various attempts to make mixed fertilizers which can be scattered, by incorporating potassium salts or ammonium salts with nitro-phosphates, that is to say mixtures containing phosphates and calcium nitrate produced, for instance, by treating phosphorite with nitric acid. The main idea has been to make the hygroscopic calcium nitrate innocuous by double decomposition with a suitable compound, especially with a sulphate, such as ammonium sulphate or potassium sulphate, whereby the calcium nitrate becomes gypsum. It can be shown that not only the ordinary nitro-phosphates which are rich in water are very hygroscopic, but also such mixtures thereof with potassium and ammonium salts that contain the calcium nitrate substantially unchanged. It has even been proved that the effect of the above-named additional substances, such as, for instance, potassium nitrate or ammonium nitrate, in lowering the liquefying point, is so considerable that nitro-phosphates containing a high proportion of water which at room temperature have still a solid consistency, after addition of the said potassium salts or ammonium salts assume a liquid to pulpy consistency even at the said temperature or at a slightly higher temperature.

For instance, a nitro-phosphate containing 4 $H_2O$ which softens at a temperature between 35° and 40° C., after addition of 6 per cent. of ammonium nitrate, liquefies completely even at 25° C. A similar nitro-phosphate, after the addition of 5 per cent. of potassium chloride, becomes liquid at between 20° and 25° C.; a similar nitro-phosphate, after the addition of 7 per cent. of potassium nitrate, also liquefies at between 25° and 30° C.

According to the present invention there are made quite novel products, namely nitro-phosphates adapted to be scattered and to be stored, by adding alkali salts (including ammonium salts), particularly potassium or ammonium salts, to nitro-phosphates, previously made or in the course of production, under such conditions that the calcium nitrate contained in the final product contains considerably less than 4 molecules of water of crystallization. A content of such water in the calcium nitrate in the final product of about 2 to a maximum of 3 molecules has been proved to be essential to the invention. Products which are obtained according to this invention generally exhibit no marked lowering of the softening temperature. It has been found that in many cases this temperature is even considerably raised, particularly if the operation is conducted in such a manner that the parent material selected is a nitro-phosphate obtained by reaction of phosphorite with a nitric acid of 65-75 per cent. strength and whose calcium nitrate contains only 2-3 molecules of water, and this nitro-phosphate is mixed with such a quantity of a potassium or ammonium salt, that when the solid final product has been formed it contains for each 5 molecules of calcium nitrate at least 1 molecule of the alkali salt used, that is, potassium or ammonium salt, with the proviso that the calcium nitrate must for the main part be present in the form of dihydrate.

For example, in the case of a nitro-phosphate poor in water and having a softening point at about 50° C., by the addition of a quantity of potassium nitrate calculated in accordance with the above statement, the softening point may be raised to 80°-85° C., and by using a similar quantity of ammonium nitrate, even to 100°-105° C. The calcium corresponding to the calcium nitrate is in this case completely soluble in water, and microscopical and chemical examination shows that in both of the products almost all of the calcium nitrate is in the form of a double compound containing easily soluble potassium or ammonium nitrate, which seems to correspond with the following empirical composition:—

5 Ca $(NO_3)_2$.10 $H_2O$.Me $NO_3$ wherein Me=K or $(NH_4)$.

It is, however, also possible that other double salts are also formed by this procedure. Moreover the present process offers a further advantage in that the said nitro-phosphates containing potassium or ammonium salts solidify much more rapidly than the same products without the addition of the said salts, which as regards the maturing time of the treated phosphorite, is of considerable economical advantage.

In order to increase the nitrogen content of the nitro-phosphates, besides the additional substances named sodium nitrate may also be added; however, in this case caution must be observed, as too great a quantity of this salt lowers the softening point of the final product considerably.

In contradistinction to the known mixtures containing potassium or ammonium, the mixture of this invention contains calcium completely, or in any case substantially, in the form of a water-soluble compound. This is of special importance having regard to the valuable fertilizing properties of this calcium compound.

Instead of adding potassium or ammonium nitrate as prescribed above there may be added such potassium or ammonium salts as are capable of forming potassium or ammonium nitrate by double decomposition with a part of the calcium nitrate. Similarly, mixtures of potassium and ammonium salts may be added to the nitrophosphates. Furthermore, other substances acting as fertilizers or stimulants, such as magnesium salts, may be added to the products obtained in the manner prescribed.

The ratio of phosphoric acid, nitrogen and potassium may be varied within wide limits, provided that the final product is sufficiently poor in water in the sense already mentioned.

The quality of the final product is not influenced by the manner of preparation; for example, phosphorite may be treated with simultaneous or subsequent addition of potassium or ammonium salt, with a nitric acid having a concentration of 65-75 per cent., and in such proportion that a product which is relatively poor in water is obtained; or one can start from nitro-phosphates which are rich in water, even aqueous solutions, which are suitably concentrated and dried, provided that considerably less than 4, preferably only 2-3 molecules of water of crystallization are available for the calcium nitrate contained in the final product.

The following examples illustrate the invention:—

(1) 100 kilos of Morocco phosphorite are treated with 98 kilos of a nitric acid of 72.6 per cent. strength. When the reaction is complete, a nitro-phosphate which is relatively poor in water having been formed, 9 kilos of ammonium nitrate are added to the warm, plastic mass. The pulp begins to stiffen partially even at 70° C., and on further cooling solidifies rapidly to a solid, friable mass yielding a product which can be scattered very easily.

(2) 100 kilos of Morocco phosphorite are mixed with 66 kilos of potassium nitrate, and the mixture is treated with 98 kilos of nitric acid of 72.6 per cent. strength. A compact mass which solidifies rapidly is obtained as final product; it is friable and can be scattered very easily. The product contains 9.5 per cent. N, 12 per cent. $P_2O_5$ and 11.4 per cent. $K_2O$.

In all cases, the products obtained constitute remarkable fertilizers or manures adapted to be scattered and to be stored under best conditions.

What I claim is:—

1. Process for the production of scatterable and stable nitrophosphates comprising treating phosphorites with nitric acid and, before solidification of the treated product, adding thereto a nitrate of the formula $MeNO_3$ wherein Me designates potassium or ammonium, the proportions of the nitrate added and of the water introduced into the process through the nitric acid being regulated so that the final product contains at least one mole of $MeNO_3$ for each 5 moles of calcium nitrate and a maximum of 3 moles of water of crystallization for each mole of calcium nitrate.

2. The process defined in claim 1, the nitric acid used being of 65% to 75% concentration.

3. Process for the production of scatterable and stable nitrophosphates comprising adding to phosphorite a nitrate of the formula $MeNO_3$, wherein Me designates K or $NH_4$, and treating the mixture with nitric acid, the proportion of the nitrate added and the concentration of the nitric acid being regulated so that the final product contains at least one mole of $MeNO_3$ for each 5 moles of calcium nitrate and a maximum of 3 moles of water of crystallization for each mole of calcium nitrate.

4. The process defined in claim 1, a limited quantity of sodium nitrate being added in addition to the $MeNO_3$.

5. Process for the production of scatterable and stable nitrophosphates comprising treating phosphorite with nitric acid and, before solidification of the treated product, adding thereto a salt of an alkali of the group: potassium and ammonium, said salt being adapted through double decomposition with calcium nitrate, to form the corresponding alkali nitrate, the quantity of added salt and the concentration of the nitric acid being so proportioned that the calcium in the final product for the greater part is in water soluble form and contains a maximum of 3 moles of water of crystallization for each mole of calcium nitrate.

6. Process for the production of scatterable and stable nitrophosphates comprising treating phosphorite with nitric acid and, before solidification of the treated product, adding a nitrate of the formula $MeNO_3$ wherein Me designates K or $NH_4$, and at least one other product with fertilizing action, the quantity of nitrate added and the concentration of the nitric acid used being regulated so that the final product contains at least one mole of $MeNO_3$ for each 5 moles of calcium nitrate and a maximum of 3 moles of water of crystallization for each mole of calcium nitrate.

7. Process for the production of scatterable and stable nitrophosphates comprising treating phosphorite with nitric acid and, before solidification of the treated product, adding thereto a salt of an alkali of the group comprising potassium and ammonium, said salt being adapted, through double decomposition with calcium nitrate, to form the corresponding alkali nitrate, adding at least one additional product with fertilizing action, and regulating the quantity of salt added and the concentration of the nitric acid so that the final product contains at least one mole of alkali nitrate for each 5 moles of calcium nitrate and a maximum of 3 moles of water of crystallization for each mole of calcium nitrate.

8. As a fertilizer, the product resulting from the treatment of a phosphorite with nitric acid, the incorporation of a nitrate of an alkali of the group comprising potassium and ammonium, and the solidification of the reaction mixture, said product containing, in addition to calcium monophosphate and calcium nitrate, at least one mole of said alkali nitrate for each five moles of calcium nitrate and 2-3 moles of water of crystallization for each mole of calcium nitrate.

9. The fertilizer set forth in claim 8, said product containing at least one complex compound of calcium nitrate with said alkali nitrate.

EMIL LÜSCHER.